United States Patent [19]
Squires

[11] 3,939,569
[45] Feb. 24, 1976

[54] INSPECTION TOOL OR DEVICE

[76] Inventor: Wayne H. Squires, 8005 N. 28th Ave., Phoenix, Ariz. 85021

[22] Filed: Oct. 15, 1974

[21] Appl. No.: 514,737

[52] U.S. Cl. ............ 33/174 L; 33/169 R; 33/172 R; 33/174 Q
[51] Int. Cl.² ...................... G01B 3/22; G01B 5/00
[58] Field of Search .......... 33/174 P, 174 Q, 174 R, 33/174 L, 169 R, 172 R, 172 B, 172 E, 171, 1 BB

[56] References Cited
UNITED STATES PATENTS

| | | | |
|---|---|---|---|
| 1,231,185 | 6/1917 | Muller | 33/169 R |
| 1,778,481 | 10/1930 | Boucher | 33/172 R |
| 2,371,451 | 3/1945 | Larson | 33/172 R |
| 2,623,296 | 12/1952 | Bugge et al. | 33/203.19 |
| 2,965,970 | 12/1960 | Rocheleau | 33/172 B |
| 3,315,366 | 4/1967 | Marshall | 33/203.19 |
| 3,501,841 | 3/1970 | Adams | 33/174 P |

FOREIGN PATENTS OR APPLICATIONS

| | | | |
|---|---|---|---|
| 133,432 | 10/1951 | Sweden | 33/172 |

Primary Examiner—Richard E. Aegerter
Assistant Examiner—John W. Shepperd
Attorney, Agent, or Firm—Warren F. B. Lindsley

[57] ABSTRACT

An inspection tool having a base positioned and secured on any flat surface and manually adjusted with the assistance of visual indicating means so that the base and all its associated movable or stationary components are in absolute true vertical and horizontal planes relative to the flat surface on which they are mounted. The tool is then utilized with its visual indicating means for determining the relative squareness, angularity, smoothness and other characteristics of the surfaces of the object being inspected.

4 Claims, 5 Drawing Figures

INSPECTION TOOL OR DEVICE

BACKGROUND OF THE INVENTION

1. Field of the Invention

This invention pertains to a portable tool removably mounted on or attached to a surface plate or any other flat surface for use in visually examining the surfaces of the object being inspected for squareness, angularity or other characteristics.

2. Description of the Prior Art

Many types of tools have been used in the past for examining vertical, horizontal and angular surfaces and the height of various objects. Most of these tools have been squares, levels, height gauges, protractors, etc., some of which were adjustable. Most of these tools are still used extensively, mainly because of their relative inexpensive initial and maintenance costs.

More complicated and expensive devices such as dial test indicators, comparators and bench gauges utilize visual, graduated, mechanically or electronically operated dials in association with suitable contact points for checking the accuracy of the inspected objects. These devices usually have the disadvantages of being capable of only checking or examining one surface feature of the object without resetting and adjustment of their functioning components.

In view of the disadvantages pointed out above relative to the use of the less expensive, small tool variety of devices for checking or inspecting the critical aspects of the various surface characteristics of an object and the use of the more expensive variety of direct reading, dial equipped devices for the same purposes, a new and improved inspection tool or device has been provided which is simple in its design and usage, comparatively inexpensive to construct and which may be utilized easily and successfully by inspectors for visually checking surface characteristics of the objects inspected.

SUMMARY OF THE INVENTION

It is therefore an object of this invention to provide a portable inspection tool that may be utilized in conjunction with a surface plate or flat surface to visually check the various surface characteristics of the objects being inspected.

Another object of this invention is to provide a portable inspection tool that may be temporarily, immovably attached to a surface plate or flat surface and adjusted with the aid of visual indicating and leveling means so that all of its stationary or movable components are always in true perpendicular and horizontal planes relative to the flat surface upon which it is mounted and to the surfaces of the object being inspected.

A further object of this invention is to provide a portable inspection tool or device having two or more adjustable tramming arms that are equipped with dial indicator means having sensitive contact points such that when placed in direct contact with any surface of an object being inspected, they visually determine the correctness of angularity and other surface conditions by a vertical reciprocating motion or a horizontal radial motion of the contact points imposed on said surfaces.

A still further object of this invention is to provide a portable inspection tool that is used as a height gauge by simply adjusting one of its tramming arms so that its dial indicator contact point is positioned at the desired exact height dimension above the level of the surface plate on which the device is mounted.

Further objects and advantages of this invention will become apparent as the following description proceeds and the features of novelty which characterize the invention will be pointed out with particularity in the claims annexed to and forming part of this specification.

BRIEF DESCRIPTION OF THE DRAWINGS

FIG. 5 is a vertical sectional fragmentary view taken on line 5—5 of FIG. 3 illustrating the related association of the stationary tramming head, the movable or reciprocating tramming head, the actuating square threaded vertical shaft and a rotatable head support member which are used when the device is initially being trammed in.

DESCRIPTION OF THE PREFERRED EMBODIMENT

Figure 1:
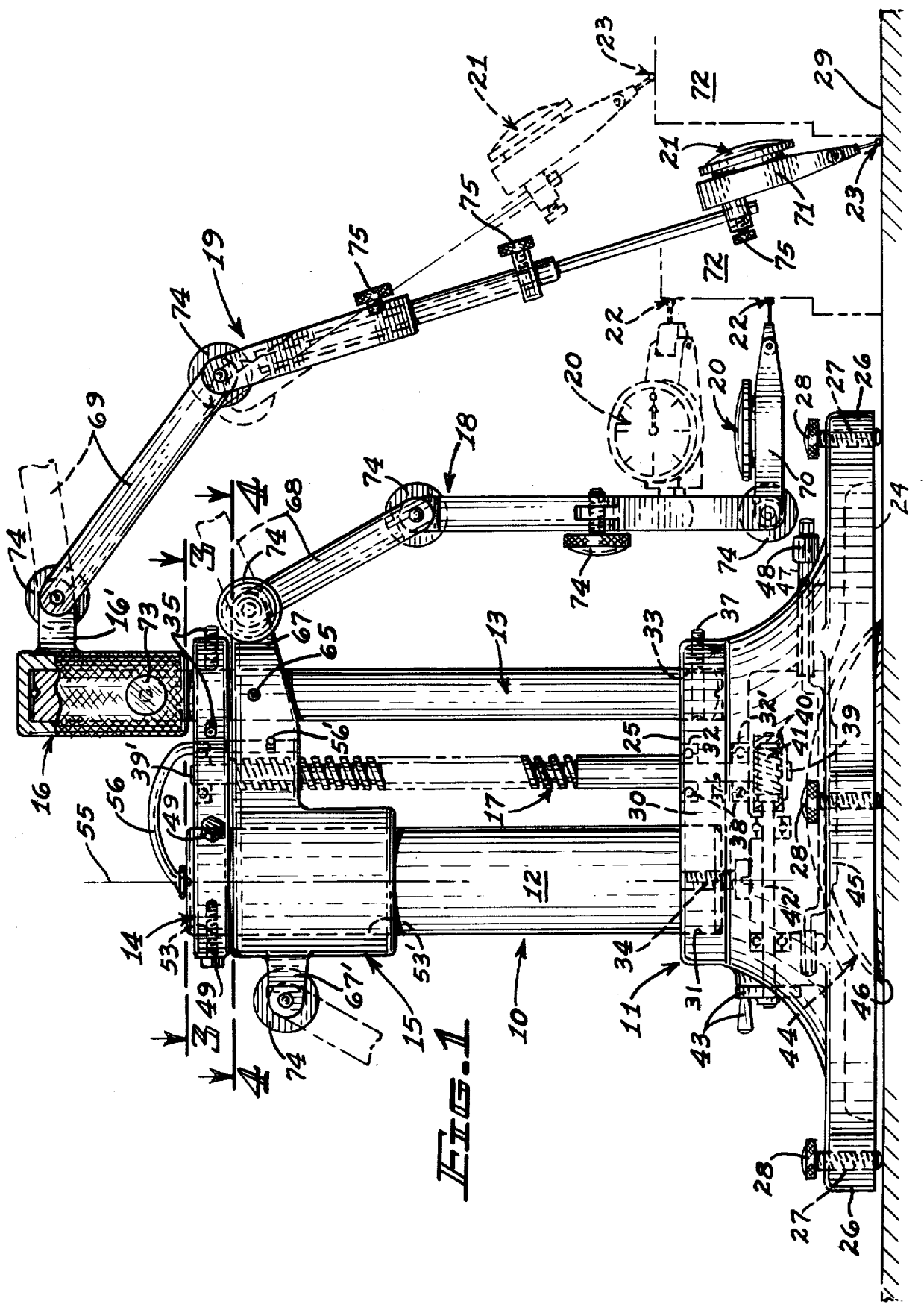
FIG. 1 is a side elevational view of the portable inspection tool of this invention illustrating one method of mounting and attaching its base portion to a flat surface and several of the possible adjustable positions of its tramming arms and dial indicator contact points relative to the surfaces of objects being inspected (shown in dot-dash lines).

Referring more particularly to the drawings by characters of reference, FIG. 1 illustrates a side elevational view of an inspection tool or device 10 of this invention comprising a base member 11, cylindrical stationary vertical support posts 12 and 13, a top stationary head 14, a lower movable tramming head 15, a cylindrical rotatable tramming head 16, a movable head activating threaded shaft 17, and two or more adjustable tramming arms 18 and 19, the lower sections of which are equipped with dial indicators 20 and 21 and dial indicator contact points 22 and 23, respectively.

Base member 11 preferably consists of a heavy metal casting having a substantially hollow interior that is formed and machined to present a flat horizontal finished bottom surface 24 and a similar finished top plateau surface 25. Its outer periphery is provided with a plurality of radially extending, equally spaced lugs or bosses 26 that are each provided with centrally located, radially spaced drilled and tapped holes 27 that extend through the thickness of the lugs or bosses and are adapted to receive suitable thumb screws 28. The thumb screws are used to tram in the base member 11 and post 12 level surface 29 of a surface plate or any other flat surface upon which the inspection tool or device 10 is mounted.

It should be understood that the particular shape and form of the base member 11 is not pertinent to the invention, as long as there is provided a sufficiently large hollow interior space to allow for movable components therein, a flat horizontal finished bottom or base surface 24 extending under the lugs or bosses 26, and a flat horizontal top plateau surface 25 into which the vertical support posts 12 and 13 extend.

Extending downwardly through the horizontal flat finished top plateau surface 25 of the base member 11 and into its top solid ceiling portion 30 are provided three, longitudinally aligned counterbores 31, 32 and 33, respectively, that are spaced a predetermined distance apart according to similar sized bores or counterbores in the tramming heads 14 and 15. The counterbore 31 is adapted to receive and support in rigid perpendicular relationship to the top surface 25 of the base, the bottom end of the large cylindrical vertical support post 12 by means of a threaded screw 34 which extends upwardly through the solid ceiling portion 30 of the base into a centrally aligned threaded hole in the bottom flat end of the post.

The counterbore 33 is of similar depth as the counterbore 31; but is considerably smaller in its diameter and has a somewhat greater tolerance to provide for the reception of the bottom rounded end of the cylindrical, vertical support post 13. Post 13 is provided with a central conical depression that allows the post to pivot slightly on a similar conical or ball projection, centrally formed in the bottom of the counterbore, so that its true perpendicular and parallel relationship with the horizontal surface 29 and the large vertical support post 12 can be obtained by the adjustment of several set screws 35 which project into a similar sized through bore 36 in one end portion of the top fixed stationary head 14. The bottom end of the small cylindrical post 13 is also provided with a circular groove into which a set screw 37 is adapted to extend to prevent vertical movement of the same after the described perpendicular adjustment has been performed.

Directly below and in vertical alignment with the axis of the counterbore 32 in the horizontal ceiling surface of top solid ceiling portion 30, is provided an identical counterbore 32'. These counterbores are joined by a central vertical bore 37'. The aligned counterbores 32 and 32' are each provided with identical bearings 38 that together with bore 37' are adapted to receive and support the lower reduced diameter end portion 39 of the square threaded vertical shaft 17 on the horizontal surface 25 of the base in free rotative relationship therein. Fixed to the bottom end of the reduced diameter portion 39 of the threaded shaft 17 is a suitable pinion gear 40 that is in constant mesh with a mating worm gear 41 fixed on the inner end of a rotatable shaft 42 that is journaled in suitable bearings. Shaft 42 extends out through a flat vertical wall portion of the base member 11 where it is attached to a crank arm and lever 43 that may be utilized to rotate the threaded vertical shaft 17 in either a clockwise or counterclockwise direction. This action causes the lower movable tramming head 15 to move up or down as required during an inspection procedure.

Figure 2:
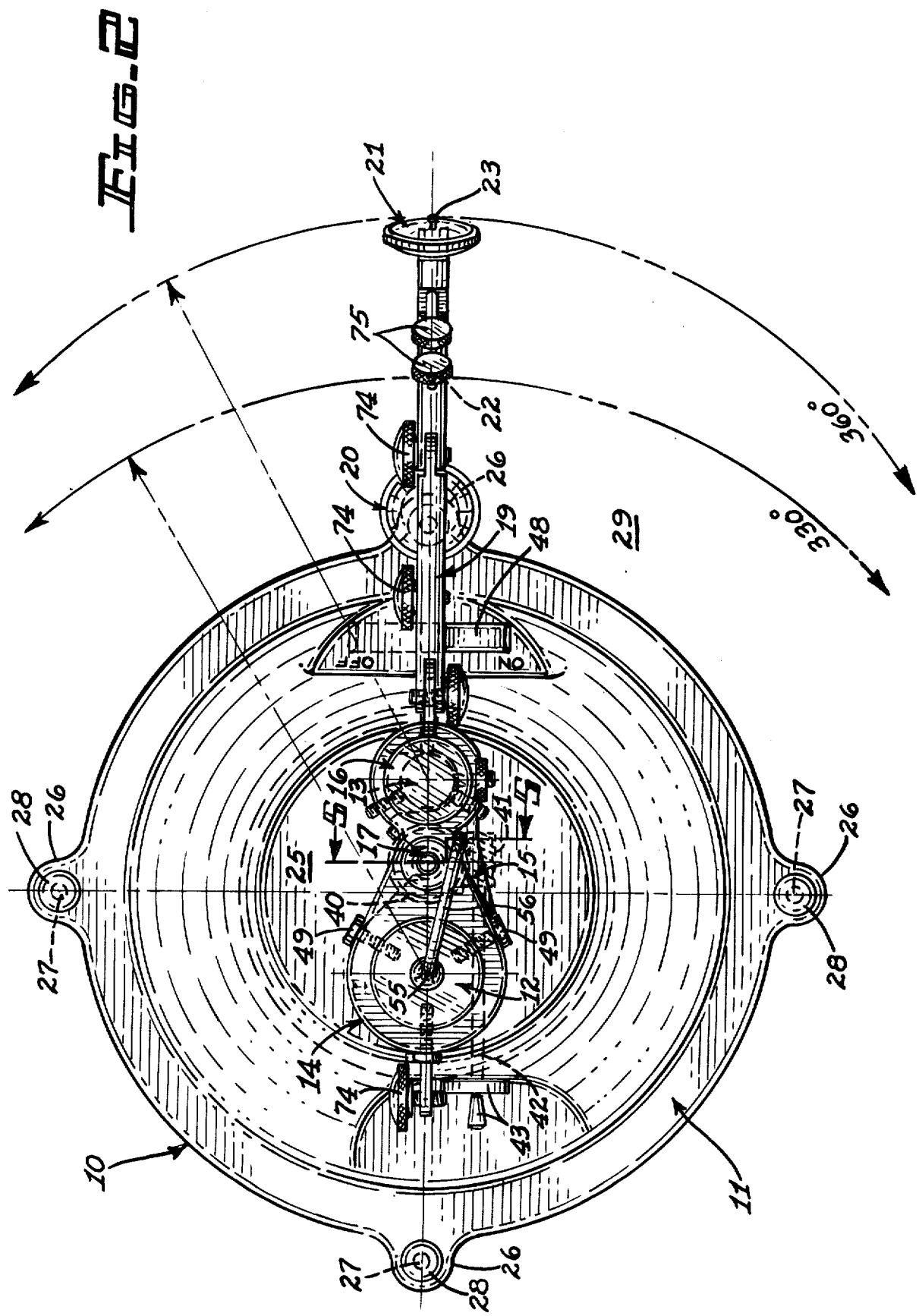
FIG. 2 is a plan view of the tool shown in FIG. 1 illustrating the relationship of its stationary and movable components and indicating the possible degree of rotation of its adjustable tramming arms about their center or vertical axis of rotation.

In order to maintain the selected position of the inspection device on the top surface 29 of the surface plate or other level surface, the base member 11 is provided with a hold down means which may be either a magnetic arrangement or a vacuum device (as shown) which consists of a large flexible rubber or vinyl suction cup 44 that has a thick upper crown portion 45 and a thin tapered circular bottom edge 46. The suction cup is adapted to contact the level surface 29 in sealing relationship and hold a vacuum therein when in its "ON" position and to release the vacuum when in its "OFF" position, as illustrated in FIGS. 1 and 2 of the drawings. The flexible suction cup is activated to assume either relationship by the 180 degree rotation of a bell crank member 47, the crank portion of which is embedded in the thick upper crown portion 45 of the suction cup 44. The opposed ends of this crank member are journaled in horizontal drilled apertures in the housing of the base member 11, one end of which extends beyond the confines of the base where it is provided with an actuating lever 48. This suction cup maintains and temporarily attaches the inspection device 10 in the desired position and location on the level surface 29 for its subsequent use.

Figure 3:
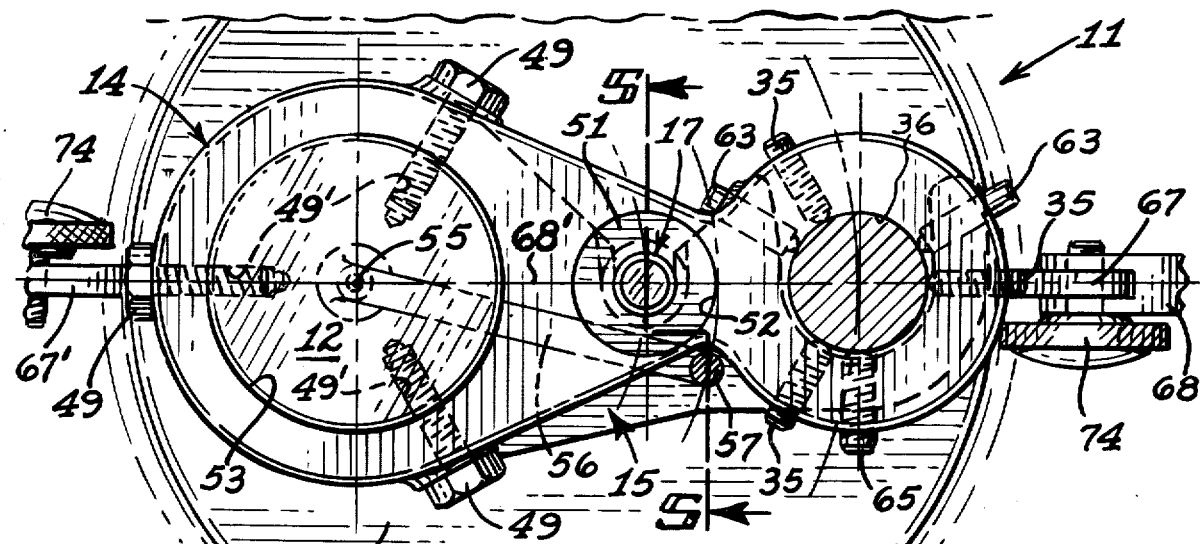
FIG. 3 is an enlarged fragmentary plan view, partly in section, taken on the line 3-3 of FIG. 1 illustrating more clearly the normal relationship between the stationary and movable tramming heads and other associated components when the tool is in position for checking the surfaces of various objects.
Figure 5:
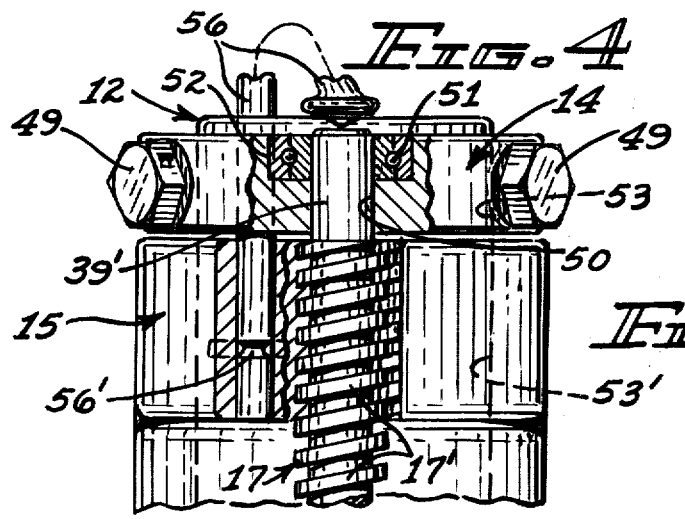

The cylindrical vertical support posts 12 and 13 and the head activating threaded shaft 17 are constantly maintained in longitudinal alignment and parallel perpendicular relationship to the flat horizontal top plateau surface 25 of the base member 11 and to each other by means of the top stationary tie bar head 14. Tie in head 14 functions as a removable tie-bar for the three vertical members with which it is directly associated and rigidly secured to by a plurality of stud bolts 49 at its large end and a plurality of set screws 35 at its smaller end. The reduced diameter upper end portion 39' of the threaded shaft 17 extends upwardly through a clearance bore 50 in tie bar head 14 into the center of a suitable bearing 51 which is mounted in a central counterbore 52 in the top surface of the stationary tie bar head 14, as shwon in FIGS. 3 and 5 of the drawings.

The large diameter cylindrical post 12 is adapted to extend upwardly through a close fitting clearance bore 53 centrally located in the large circular end of the stationary tie bar head 14 and extends slightly above the top surface of the head. The smaller diameter cylindrical post 13 is adapted to extend upwardly through the more loosely fitted clearance bore 36 centrally located in the smaller circular end of the tie bar head, a considerable distance to provide for the reception of the cylindrical, rotatable trammel head 16. Tie in head 16 has a radially extending support arm 16' and the adjustable thumb screw the purpose and function of which will be described.

Stud bolts 49 are long enough to extend through radially spaced clearance bores in the large circular end of the stationary tie bar head 14 and into mating threaded bores 49' in the large cylindrical post 12 and are adapted to be drawn up tightly. Set screws 35 in the smaller circular end of the head are to position the smaller cylindrical support post 13 in vertical perpendicular aligned relationship with the large support post 12 by the tramming head 16.

It should be noted that the general shape of the stationary tramming head or tie bar 14 and the lower movable tramming head 15 are similar in most respects. Both have substantially circular, large and small end portions and tapered reduced widths at a radially spaced equal distance from the vertical axis of the large cylindrical post 12 and the bore 53 in head 14 through which it extends. The width of the stationary head or tie bar 14 at this point is somewhat smaller than the respective width of the movable tramming head 15 to provide working clearance for the rotatable holding or support member 56. The lower vertical end of member 56 is retained in a vertical bore 57 in the movable tramming head 15 by a dowel pin 56', the other end of which is provided with a flat disc having a ball like bottom projection which is adapted to ride in a conical depression formed in the flat top surface of the large support post 12 at its center or vertical axis 55.

It also should be noted that the lower movable tramming head 15 must be installed in sliding relationship on the vertical posts 12 and 13 and in radial pivoted relationship to the large diameter post 12, before the top stationary tramming head or tie bar 14 and the rotatable tramming head 16 can be installed.

The movable tramming head 15 is provided at its large circular shaped end with a central vertical clearance bore 53'. This bore is in exact vertical, longitudinal and horizontal alignment with the vertical axis of post 12 and bore 53 in the stationary head 14 through which post 12 extends.

Figure 4:
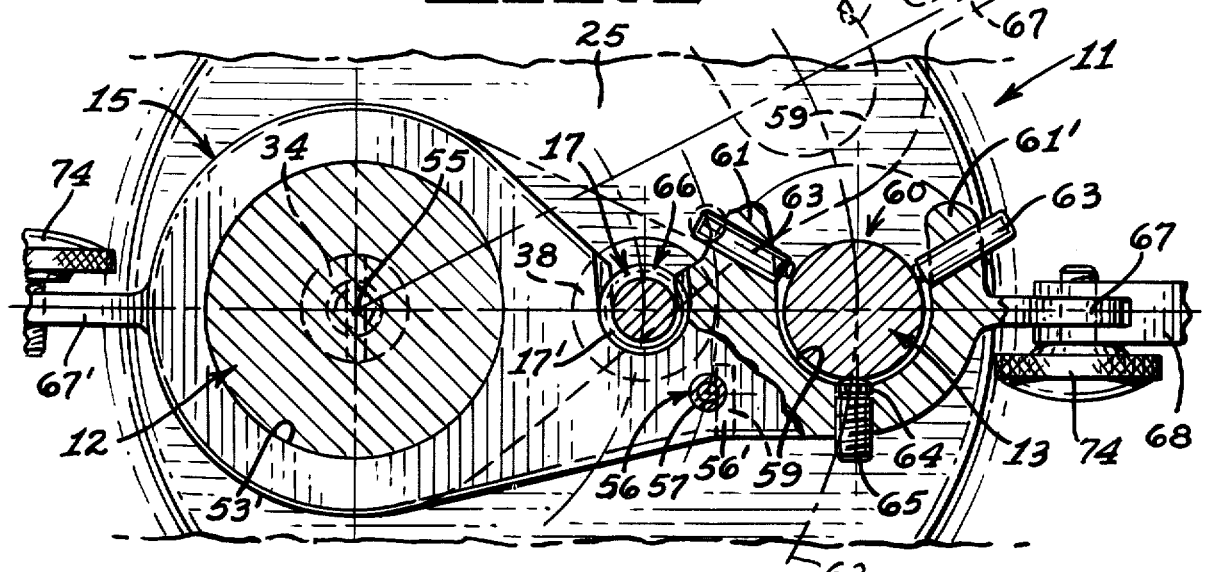
FIG. 4 is an enlarged fragmentary sectional plan view taken on the line 4-4 of FIG. 1 showing the relationship between the vertical tramming posts, the lower movable tramming head and the vertically mounted, acme threaded shaft that is adapted to reciprocate the lower movable tramming head during the surface inspection function of the device and (in dotted lines) the possible 330° of rotary travel of the tramming head which is utilized for initially tramming in or leveling the device on a surface plate or other flat surface.

The smaller semi-circular end portion of head 15 is provided with a semi-circular milled out portion 59, the radius of which is somewhat larger than the radius of the small vertical post 13 upon which it is centered. The sides of milled out portion 59 form the opening or cutout 60 having integral projecting ears 61 and 61'. The tangent side walls of the opening or cutout 60 are formed in parallel radial relationship with the imaginary radial center line 62 which is swung from the vertical axis 55 of the post 12 and the center of the bores 53 and 53'. Thus, when tramming head 15 is rotated about vertical axis 55, the small semi-circular end of the head and its opening or cutout portion 60 will partially enclose the vertical cylindrical outer surface of the small vertical post 13, as shown (in solid line) in FIG. 4, or be entirely removed therefrom as indicated (by dotted line) in the same figure. This action depends on its direction of rotation and when partially enclosing the vertical post 13, this end of tramming head 15 is maintained in this relation by means of a pair of spring loaded ball ended detents 63. These detents yieldingly contact the outer cylindrical surface of post 13 and by the adjustable, preferably vinyl, end washer 64 that is attached to a centrally located set screw 65 threaded into the semi-circular wall of the small end of the tramming head 15 and snap into partially surrounding, locked radial relationship with the vertical post 13 however still allowing for free reciprocating motion of the tramming head 15.

The free reciprocating motion of trammel head 15 is accomplished by the clockwise or counterclockwise rotation of shaft 17 which is rotated by crank arm and lever 43. To this end the narrow width portion of the head is provided with a radial transverse opening 66 on the same side of head 15 as the above described radial opening 60. Opening 66 has a semi-circular bottom end with radially tangent sides that is provided with square threads that extend from top to bottom of the head and are adapted to mate and mesh with the square threads 17' formed on the vertical shaft 17 to raise or lower the head when required to perform its inspection function.

The lower movable trammel head 15 is provided with one or more flat sided, radially extending, integral support arms 67 and 67' that are preferably located in alignment with the longitudinal center line 68 of the heads 14 and 15 and the vertical posts 12 and 13. Arm 67 is adapted to receive and support in pivoted relationship therewith the upper bifurcated end segment 68 of the adjustable tramming arm 18 as likewise is the radial extending arm 16' on the rotatable trammel head 16, which is adapted to receive and support the upper end segment 69 of the adjustable tramming arm 19. The radial support arm 67' would only be used as an auxiliary member to support the upper segment of another adjustable tramming arm (shown in dot-dash line) if required or to move the tramming arm 18 to a more convenient location.

The adjustable tramming arm 18 consists of several pivotally associated segments including the lower or end segment 70 which is provided with a typical well known and commonly used dial indicator 20 that is preferably marked in one thousandth (0.001) of an inch graduations, and the usual dial indicator contact points 22 or 23 which may be one of two well known types. One type actuates the pointer of the indicator to move radially away from the "0" graduation upon any angular or arcuate movement that may be imparted to the contact point 22 and the other type of contact point 23 which is associated with the dial indicator 21 on the lower or end segment 71 of the adjustable tramming arm 19. This latter type actuates the pointer of the indicator when any (in or out) reciprocating movement is imparted to the contact point to move the indicator pointer radially to either side of the "0" graduation on the dial of the indicator. The first type of dial indicator contact point 23 is recommended for use when inspecting vertical surfaces of an object such as indicated at 72 (in dot-dash line) in FIG. 1 of the drawings and the latter type of contact point 23 is recommended for use when inspecting horizontal surfaces of such an object.

OPERATION AND USE OF THE INVENTION

With the various associated components of the inspection tool or device 10 assembled in their proper relation, the device is made ready for performing its function of examining or checking the relative squareness, angularity, smoothness and other irregularities of the surfaces of an object by the following procedure:

First a site on the top surface 29 of a surface plate or other substantially flat surface which is most convenient to the user or inspector is selected for the rigid attachment of the device to the same. Then the flexible suction cup 44 is activated to secure the device to the surface 29 in the selected location as previously described. The adjustable tramming arms 18 and 19 are then arranged so their dial indicator contact points 22 and 23 are in yielding contact with the surface 29 of the plate and with the pointers of the dial indicators 20 and 21 positioned at the "0" graduation. The lower movable tramming head 15 is in its uppermost position with its small semi-circular end portion removed from its association with the vertical support post 13. The tramming head is then manually rotated in a clockwise to counterclockwise direction for approximately 330 degrees with the contact point 22 of the dial indicator 20 scribing an imaginary circular line on the surface 29 of the plate. At the same time the thumb screws 28 in the base of the assembled device is adjusted until the dial indicator pointer remains at the "0" graduation through the full (330) degrees of the tramming head and contact point 22's rotary travel. This indicates that the assembled inspection tool or device 10 is in perfect horizontal, parallel alignment with the surface 29 of the plate and that said surface is also perfectly level.

After checking and adjusting the relative relationship between the device and the area of the surface plate on which it is mounted, the tramming head 15 is returned to its normal operative position. This is desired relationship can be double-checked by manually rotating the cylindrical tramming head 16 with the attached adjustable tramming arm 19 and the dial indicator contact point 23 in contact with the surface 29 of the plate, a full 360° about the vertical center of the small cylindrical post 13 and then adjusting it in the desired perpendicular relationship to the post by means of a suitable thumb screw 73 as indicated in FIGS. 1 and 2 of the drawings.

When the leveling procedure described above has been accomplished, it is only necessary when checking vertical or angular surfaces to move the tramming head 15 up or down in a reciprocating motion by means of the rotatable crank arm and lever 43. With the indicator contact point 22 in yielding contact with the vertical or angular surface being inspected one can note the precise movement of the dial indicator pointer relative to the "0" graduation on visable the dial.

The relative squareness, angularity, levelness or other irregularities of horizontal surfaces can be inspected or checked in a similar manner by arranging the segments of the adjustable tramming arm 19 so that the dial indicator contact point 23 is in yielding relation with the substantially horizontal surface of the object 72 being examined. By rotating the tramming head 16, the adjustable tramming arm 19 with its dial indicator contact point will describe an arc back and forth over the surface being examined. Again, one may note the precise movement of the dial indicator pointer relative to the "0" graduation on the visable dial.

It is evident from the foregoing disclosure that an inspection tool or device has been provided that is capable of being utilized even by a novice inspector for visually examining the vertical, horizontal or angular surfaces of an object for characteristics other than the normal by movement of the proper type of dial indicator contact points over such surfaces. It also should be evident and understood that the inspection device could readily be used as a height gauge by merely adjusting one of the arms 18 or 19 so that the tip of its contact point is positioned at the exact vertical height dimension from the level surface 29 of the object being checked and passing the object while resting on the surface 29 under the contact point and visually observing any discrepancy on the dial indicator. It also should be understood that each time the tramming arms 18 and 19 are adjusted for the purpose of checking a surface by either pivoting the segments of the adjustable arms about their pivot points the relative longitudinal relationship of the telescoping segments of the tramming arms may be adjusted.

Although but one embodiment of the present invention has been shown and described, it should be apparent to those skilled in the art that various changes and modifications may be made therein without departing from the spirit of the invention or from the scope of the appended claims.

What is claimed is:

1. An inspection tool for positioning on a level surface and manually adjusted so that its base and associated movable and stationary components are in vertical and horizontal planes relative to the surface on which it is mounted so that the tool may be used for determining the relative squareness, angularity and other characteristics of the surface of an object being inspected comprising:
   a base member,
   a pair of cylindrical support posts mounted to extend laterally from said base member,
   a stationary tie bar fixedly mounted on the upper ends of said support posts,
   a first movable tramming head, means mounting said head for sliding and rotating movement on one of said pair of support posts, and said head having groove means for detachably engaging the other of said pair of support posts,
   a second rotating tramming head being mounted on the other of said posts,
   a hearing mounted in said tie bar,
   a moveable head activating shaft mounted on said base and arranged to extend substantially parallel with said support posts with its free end rotatably mounted in said hearing,
   said shaft being threadedly engageable with said frst movable tramming head for causing movement of said first moveable head axially along said support posts,
   said first tramming head having a second groove means for detachably engaging said shaft,
   a pair of tramming arms one mounted on each of said first and second moveable tramming heads, and
   a pair of dial indicators one mounted at the end of each of said tramming arms for indicating surface conditions over which they traverse.

2. The inspection tool set forth in claim 1 wherein:
   said first movable tramming head is provided with a groove for partially encircling said other support post, and
   means for detachably holding said first tramming head to said other support post in the groove of said first moveable tramming head.

3. The inspection tool set forth in claim wherein:
   said first moveable tramming head when released from said grooves is rotatable through an arc of approximately 330°.

4. The inspection tool set forth in claim 3 in further combination with:
   means for rotating said second moveable tramming head 360° about said one of said support posts on which said first moveable tramming head is mounted.

* * * * *

UNITED STATES PATENT OFFICE
CERTIFICATE OF CORRECTION

Patent No. 3,939,569      Dated February 24, 1976

Inventor(s) Wayne H. Squires

It is certified that error appears in the above-identified patent and that said Letters Patent are hereby corrected as shown below:

Column 8, line 26, "hearing" should read -- bearing --;

line 30, "hearing" should read -- bearing --; line 31, "frst"

should read -- first --; line 49, after "claim" insert -- 1 --.

Signed and Sealed this eleventh Day of May 1976

[SEAL]

Attest:

RUTH C. MASON
Attesting Officer

C. MARSHALL DANN
Commissioner of Patents and Trademarks